(12) United States Patent
Canestaro et al.

(10) Patent No.: US 6,438,714 B1
(45) Date of Patent: Aug. 20, 2002

(54) METHOD AND APPARATUS FOR TESTING LARGE ARRAYS OF STORAGE DEVICES

(75) Inventors: Christopher Canestaro; Carl Phillip Gusler; Rick A. Hamilton, II; John Steven Langford, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,627

(22) Filed: Mar. 31, 1999

(51) Int. Cl.[7] .............................................. G06F 11/00
(52) U.S. Cl. ..................................... 714/42; 711/112
(58) Field of Search .............................. 714/42, 47, 48, 714/5, 6, 13, 39, 43, 25, 38; 711/112, 114, 115

(56) References Cited

U.S. PATENT DOCUMENTS

| | | | | |
|---|---|---|---|---|
| 3,917,933 A | * | 11/1975 | Scheuneman et al. | 235/153 |
| 4,746,995 A | | 5/1988 | Rauskolb | 390/31 |
| 5,535,381 A | * | 7/1996 | Kopper | 395/600 |
| 5,539,875 A | * | 7/1996 | Bishop et al. | 395/182.1 |
| 5,574,855 A | | 11/1996 | Rosich et al. | 395/183.17 |
| 5,819,292 A | * | 10/1998 | Hitz et al. | 707/203 |
| 5,819,310 A | * | 10/1998 | Vishlitzky et al. | 711/114 |
| 5,987,566 A | * | 11/1999 | Vishlitzky et al. | 711/114 |
| 6,029,231 A | * | 2/2000 | Blumenau | 711/162 |
| 6,058,494 A | * | 5/2000 | Gold et al. | 714/42 |
| 6,108,749 A | * | 8/2000 | White et al. | 711/112 |
| 6,275,953 B1 | * | 8/2001 | Vahalia et al. | 714/11 |

* cited by examiner

Primary Examiner—Nadeem Iqbal
(74) Attorney, Agent, or Firm—Duke W. Yee; David A. Mims, Jr.; Lisa L. B. Yociss

(57) ABSTRACT

A method and apparatus for testing storage devices in communication with a computer. Logical volumes are created on each storage device. Also, a file system is created on a first storage device in the storage devices, wherein the first storage device is a current storage device. The file system is copied from the current storage device to another storage device, wherein the another storage device is a storage device that has not received a copy of the file system wherein the another storage device becomes the current storage device. The file system is copied over and over again until all of the storage devices have received a copy of the file system. At this point, a single pass through these storage devices has occurred. Different numbers of passes may be selected depending on the amount of time during which testing should occur.

48 Claims, 16 Drawing Sheets

```
!/bin/ksh
####################################################################
# Rick Hamilton, IBM Global Services
# rick@austin..ibm.com           512-469-8223

# ssa_test Version 2.0
# October 6, 1998

# The following is an ssa exercisor script, designed to create
# and move file systems between various disks.  The steps it
# takes are as follows:

# -  Perform initialization, disk interrogations, and setting up
#       of necessary files.
# -  Create a Logical Volume on each disk in the ssatest volumegroup.
# -  Create a file system on the first disk.
# -  Copy the contents of the first logical volume to subsequent
#       logical volumes.
####################################################################
#     Copyright 1998, IBM Corporation
####################################################################
# Changes from 1.0 to 2.0 were all cosmetic: getting rid of commented
# code, providing better formatting for output echo statements, etc.
####################################################################

####################################################################
#                    INITIALIZATION
####################################################################

####################################################################
# set up runtime variables
####################################################################
integer total_disks           # count of total number of disks
integer disk_index            # index to which disk we're working with
integer numpasses             # number of passes requested by user
integer num_fs_created        # number of file systems created
integer num_fs_moved          # number of successful fs moves
integer next_disk             # used in tracking disk numbers
integer this_pass             # index to show number passes completed
integer possible_errors       # did we see any hdisk errors?

VERSION="2.0"
user_choice=n                 # to clean up disks or not?
volumegroup=ssavg             # takes on value of vol group (default to
this)
volumegroupvalid=FALSE        # does user entry match existing volume
group
verbose_mode=FALSE            # tells us whether to print to console
first_disk=pdisk0             # name of first disk (default to this)

results_file=./ssa_test_results       # place to store the results
```

```
disk_files=./ssa_test_disks          # temporary storage file
numpasses=100                        # default value of passes through volume
group
num_fs_created=0                     # to start with, no filesystems yet
created
num_fs_moved=0                       # to start with, no filesystems yet
moved
this_pass=1                          # this is first pass through disks
#################################################################
#                          FUNCTIONS
#################################################################
#################################################################
# Below is function to clean up logical volumes and file systems
#################################################################
function clean_up_prompt
{
    echo
    echo "Please press y or Y to clean up logical volume and file
syste
ms."
    read user_choice?">"
    if   [ [    (   $ user_choice = Y     $user_choice = y )  ]  ]
    then
        echo "Removing file system / ssatestdir."
        rmfs   / ssatestdir

#################################################################
# To avoid harmless-but-annoying warning messages, don't do
# this for lv$ (first_disk),  as that was removed with the
# fs above.

#################################################################
        for i in $ (cat   $disk_file   )
        do
            if  [ $i !  =$first_disk     ]
            then
                echo
                echo  "Removing logical volume lv$i."
                rmlv  -f  lv$i
            fi
        done echo
        echo  " Done with cleanup!"

else                    # else just fall through and exit without
cleaning.
        echo "Leaving logical volumes and file systems intact."
    fi
```

```
function print_results
{
        echo "Number of file systems created equal $num_fs_reated."     tee
-a      $resolts_file
        echo "Number of file systems moved equal $num_fs_moved."        tee
-a      $resolts_file
        echo " "                                                         tee
-a      $results_file
        echo "Tests completed at $ (date). "                            tee
-a      $results_file
        clean_up_prompt
}

######################################################################
MAIN LINE CODE
######################################################################
First, a usage stoement
# If zero arguments at run-time, print description and usage
################################################################ if [ $# = 0 ]
then
        echo
        echo "Usage   is:           "
        echo "        $0    [-v]    -n  <numpasses>   -g  <volume_group> "
        echo
        echo " where   -v indicates verbose mode for additional messages'
        echo "         -g should be followed by the volume group to be
used for
   the test"
        echo "                      -n should be followed by the integer value of
"
        echo "                              passes to be made through the disks,"
        echo
        exit 1
fi
        echo " "                                                 tee -a
$results_ile
        echo "Executing $0 Version $VERSION."                    tee -a
$results_ile
        echo "Copyright 1998, IBM Corporation."                  tee -a
$results_ile
        echo " "                                                 tee -a
$results_ile
```

################################################################

Perform cleanup on any existing files which may be out there from

```
if  [ -w $results_file  ]
then                                                            608
           mg $results_file $results_file.old
fi

##################################################################
# Set our run-time options based on user flags.  A syntax reminder,
# shift moves the various command line arguments to the left, allowing
# us to parse each of them, should we add more.
############################################################ for arg in $*                     # loop through command line arguments
do
     case "$arg" in
          "-v")
               verbose_mode=TRUE
               shift
               ;;
          "-g")
               volumegroup=$2     # assign vg according to user wishes if [ $verbose_mode = TRUE ]
               then
                  echo "User-requested vg is $volumegroup" tee -a $resul
ts_file
               fi for i in $(lsvg)  # see if it matches real vg
               do
                    if [ [ $volumegroup= $i ] ]
                    then
                         volumegroupvalid=TRUE
                    #    if [ $verbose_mode = TRUE ]
                    #    then
                    #       echo "Volumegroupvalid is TRUE with $volumegroup"
                    #    fi
                    fi
               done if [  $volumegroupvalid = TRUE  ]
               then
                    if [ $verbose_mode = TRUE ]
                    then
                         echo "Found volume group $volumegroup"          tee -
a $results_file
                    fi
               else
                    echo "Illegal volume group entered:   $volumegroup"
tee -a $results_file
```

FIG. 6D

```
                    echo "Valid choices are: "
                        echo "$(lsvg)"
                        exit 1
                fi shift
                shift
                ;;

"-n")
                numpasses=$2
                if [ $verbose_mode = TRUE ]
                then
                    echo "About to attempt $numpasses passes through disks."
                        tee -a $results_file
                fi shift
                shift
                ;;
        esac
done
```

```
####################################################################
# Record the time.
####################################################################
echo "Test run begun at $(date)"    tee -a $results_file
echo " "                             tee -a $results_file
```
⎬ 610

```
####################################################################
# The command below parses the names of the disks in chosen VG and writes
# them into a tmp file.
####################################################################
echo $(lsvg -p $volumegroup grep hdisk sed "s/ .*//*) >> $disk_ile
```
⎬ 612

```
####################################################################
# Count the number of disks the above routine found and assign this
# number to a variable. Using wordcount to get number of words,
# then truncating that at line 9, where by trial we see that the
# file name begins. What's left is the integer, which is then
# assigned.
############################################################## total_disks=$ (wc -w $disk_file cut -c-9)

if [ $verbose_mode = TRUE ]
then
    echo "Disks found in volume group $volumegroup = $total_disks" te
```
⎬ 614

*FIG. 6E*

```
e -a $results_file                                          618
fi
```

```
###################################################################
# Capture the value of the first disk entry in the field.
############################################################# first_disk$(cut -f "1" -d " " $disk_file

#############################################################
#                    LOGICAL VOLUME WORK
############################################################# echo " "                              tee -a $results_file
echo "Beginning Logical Volume Work"  tee -a $results_file
echo " "                              tee -a $results_file

###################################################################
# LV STEP 1.
# Create logical volume on each disk. These will be the future
# homes of the file systems.
############################################################# for i in $(cat $disk_file)
do
        if [ $verbose_mode = TRUE
        then
            echo "Making logical volume lv$i"   tee -a $results_file   616
        fi

###################################################################
# Note "5" is number of partitions chosen for out test. We are going t
o
# create logical volumes, ie., holders for the impending filesystems on
# each of these disks.
############################################################# if [ [ $i = $first_disk ] ]
        then
           mklv -y lv$i -t copy $volumegroup 5 $i
        else
           mklv -y lv$i -t copy $volumegroup 5 $i
        fi

###################################################################
# Below, we check to see, after each logical volume creation, that it
# worked okay.  If not, we exit out and alert the user.
############################################################# if [ [ $? -ne 0 ] ]
        then
```

*FIG. 6F*

```
        echo "Unable to mklv on $i"
tee -o $results_file
        echo "Tests aborted at $ (date)."
tee -o $results_file
                                                              618
        clean_up_promp
        exit 1
    fi
done                    # finished creating the logical volumes
############################################################################
#                         FILE SYSTEM WORK
############################################################################
echo
echo "Beginning File System Work"        tee -o $results_file
echo " "                                  tee -o $results_file
echo

#----------------------------------------------------------------------------
# FS STEP 1

# Create a file system on disk.
---------------------------------------------------------------------------- if [ $verbose_mode = TRUE ]
then
        echo "Making file system on lv$first_disk" tee -o $results_file
fi

#----------------------------------------------------------------------------
# Note below, specifying logical volume with -d flag, and
# specifying size of 1000*512 byte blocks = 500K using -a
# with "size" argument. Not specifying mount point, which
# would be done with -m flag.
---------------------------------------------------------------------------- crfs -v jfs -m /ssatestdir -d lv$first_disk
num_fs_created=$num_fs_created+1 if [ [ $? -ne 0 ] ]
then                                                          620
        echo "Unable to crfs on $first_disk"
tee -o $results_file
        echo "Number of file systems created equal $num_fs_created."
```

*FIG. 6G*

```
        tee -a $results_file
                echo "Number of files systems moved equal $num_fs_moved."
        tee -a $results_file echo " "
        tee -a $results_file
                echo "Tests completed at $(date)."
        tee -a $results_file clean_up_prompt
                exit 1
fi

#-------------------------------------------------------------
# At this point, we have created logical volumes on each of the
# disks. We have also just created a file system on the first
# logical volume, and made it accessible via the directory
# /ssatestdir. The next thing we want to do is to the contents
# of this first logical volume (its contents being the file
# system) to the next logical volume.
#-------------------------------------------------------------

#-------------------------------------------------------------
# FS STEP

# Copy the contents of the first logical volume into the second
# logical volume.
#-------------------------------------------------------------

#-------------------------------------------------------------
# Note: This is repeated portion of task.
------------------------------------------------------------- while [ $this_pass -le $numpasses ]
do
        #-------------------------------------------------------------
        # set up our tracking mechanism, "disk_index" and copy logical
        # volumes. Remember, disk_index represents the first, second,
        # etc. disks in the disk_file.
        #------------------------------------------------------------- disk_index=1
        next_disk=$disk_index+1                     ⎫
                                                    ⎬ 622
        while [ $disk_index -le $total_disks ]      ⎪
        do                                          ⎭

#-------------------------------------------------------------
        # If disk_index = total_disks, we need to "wrap-around" at 1
```

*FIG. 6H*

```
# copy back from the last disk to the first disk.  In this
# case, make next_disk equal the first_disk.  Also change type
# to copy.
#-----------------------------------------------------------------
```

628 {
```
        if [ $disk_index -eq $total_disks ]
        then
            next_disk=1
            chlv -t copy lv$(cut -f "$next_disk" -d " " $disk_file)
        fi if [ $verbose_mode = TRUE ]
        then
            echo "Copying contents FROM lv$ (cut -f "$disk_index" -d"
" $disk_file) \
                TO lv$ (cut -f "$#next_disk" -d" "$disk_file)"  tee -
a $results_file
        fi
```

```
#-----------------------------------------------------------------
# The statement below copies TO the first argument from the
# second argument.
#-----------------------------------------------------------------
```

630 {
```
        cplv -e lv$(cut -f "$next_disk" -d " $disk_file) -f lv$(cu
t -f "$disk_index" \
                -d " " $disk_file)
        num_fs_moved=$num_fs_moved+1
```

```
#-----------------------------------------------------------------
# Check for errors on cplv to see if it was successful.
#-----------------------------------------------------------------
```

632 {
```
        if [ [ $? -ne 0 ] ]
        then
            echo "Unable to cplv on $first_disk"
tee -a $results_file
            echo "Number of file systems created equal $num_fs_create
d." tee -a $results_file
            echo "Number of file systems moved equal $num_fs_moved."
    tee -a $results_file
            echo " "
tee -a $results_file
            echo "Tests completed at $(date)."
tee -a $results_file clean_up_prompt
            exit 1
        fi
```

*FIG. 6I*

```
#-----------------------------------------------
# Change type on lv back from JFS to copy
#-----------------------------------------------
        echo "Changing lv$(cut -f "$next_disk" -d " " $disk_file) to  ⎤
copy."                                                                 |
        chlv -t copy lv$(cut -f "$next_disk" -d " " $disk_file)        ⎬ 634
        disk_index=$disk_index+1                                       |
        next_disk=$disk_index+1                                        ⎦
    done echo " "                                              tee -
a $results_file
        echo "Completed pass $this_pass at $(date)"           tee -a
$results_file
        echo " "                                              tee -a
$results_file
    this_pass=$this_pass+1
done this_pass=$this_pass-1

###############################################
# Echo and record all critical information
#####################################################
echo "No critical failures detected!"                        ⎤  tee -
a $results-file                                              |
echo "Number of passes completed:  $this_pass"               ⎬636  tee -a
$results_file                                                |
echo " "                                                     ⎦  tee -a
$results_file

#####################################################
# check for hdisk errors
#####################################################
errpt grep hdisk > /tmp/ssatest.error.ouput
possible_errors=$(cat /tmp/ssatest.error.output wc -1)

if [ $possible_errors -eq 0 ]
then
        echo "No hdisk errors noted in system error reports."   tee -a ⎤
$results_file                                                          |
else                                                                   ⎬638
        echo "The following hdisk errors were noted in the system log: |
tee -a $results_file                                                   |
        cat /tmp/ssatest.error.output                          tee -a  ⎦
$results_file
fi
echo " "                                                       tee -a
$results_file
echo "Number of file systems created equal $num_fs_created."   tee -a
$results_file
echo "Number of file systems moved equal $num_fs_moved."       tee -a
$results_file
```

*FIG. 6J*

```
!/bin/ksh
######################################################################
# Rick Hamilton, IBM Global Services
# rick@austin.ibm.com          512-469-8223

# ssaclean.ksh Version 2.0
# October 5, 1998

# This file cleans up after an aborted run of the ssatest.ksh
# script.
######################################################################
# Copyright 1998, IBM Corporation
######################################################################
# Change from Version 1.0 to Version 2.0 was the addition of a
# synclvodm command.  This is because a "Ctl-C" issued during
# an filesystem copy can result in the ODM being out of sync wit
# the VGDA's on the disk.  This command cleans that up, if such
# a condition has occurred.
######################################################################

VERSION=2.0 echo " "
echo " Executing $0 Version $VERSION."
echo "Copyright 1998, IBM Corporation."
echo if [ ! -f ./ssa_test_disks ]
then
      echo "This executable must be run from the directory containing"
      echo "the file ssa_test_disks!"
      exit 1
fi if [ [ $# = 0 ] ]
then
      echo "Usage"   $0 <volumegroup name>"
      echo "       where <volumegroup name> is the VG on which the"
      echo "       test was being run."
      Exit 1
fi

############################################
# gather the information from the disk file
###################################### first_disk=$(cut -f "1" -d " " ./ssa_test_disks)

################################################################
# First, resync the volume group, in case Ctl-C occurred
# at a bad time.
```

```
####################################################################
echo "Resynching ODM and VGDA's.  Please wait..."    ⎫
synclvodm -v $1                                      ⎬ 702
                                                     ⎭

####################################################################
# remove the file system which is back on
# lv(first_disk) again.
############################################################## echo "Removing file system /ssatestdir."    ⎫
rmfs /ssatestdir                            ⎬ 704
                                            ⎭

####################################################################
# To avoid warning messages, don't do this for
# lv$ (first_disk), as that was removed with the
# f$ above.
############################################################## for 1 in $(cat ./ssa_test_disks)                ⎫
do                                              ⎪
    if [ $1 !=$first_disk ]                     ⎪
    then                                        ⎪
        echo                                    ⎬ 708
        echo "Removing logical volume lv$i."    ⎪
        rmlv -f lv$i                            ⎪
    fi                                          ⎪
done                                            ⎭ echo
echo "Done with cleanup!"
```

FIG. 7B

METHOD AND APPARATUS FOR TESTING LARGE ARRAYS OF STORAGE DEVICES

BACKGROUND OF THE INVENTION

1. Technical Field

The present invention relates generally to an improved data processing system and, in particular, to a method and apparatus for testing storage devices.

2. Description of Related Art

In today's computing environment, users find themselves with ever greater storage needs. As a result, it is not uncommon for a given computing information system to have hundreds or even thousands of gigabytes of disks slated for use on large database applications. These disks are often arranged in a disk array. A disk array is a subsystem consisting of multiple disk drives under command of an array controller. A typical disk array is a mass storage system that employs a number of small form factor disk drives, which are linked to each other through an intelligent controller. These disk arrays are able to provide a significant amount of storage. Grouping of these drives together can provide substantial amounts of storage to meet the needs of most computer systems. These disk drives may be 5.25 inch or 3.25 inch disk drives. The disk array allows multi-user computer systems and workstations to have access to large amounts of storage capacity.

These disk arrays also may provide protection against loss of data when mirrored or used in a redundant array of independent disks (RAID). The typical approach used is a hardware disk array in which a disk controller implements RAID algorithms and, from the point of view of an operating system, resembles a single logical disk. Even with the protection against loss of data, it is inconvenient to have disk drives fail, especially when large numbers of disks are required to provide storage for users.

With the large storage needs and the proliferation of user-swappable disks, disk manufactures are decreasing the time required to place new disk drive systems into the market place. Unfortunately, failure probabilities rise with the introduction of new technology, and these new systems often have a higher probability of failure than systems offering older technology. Further, disk drives are occasionally moved from system to system. As a result, a user may be unsure of the history of a particular disk drive when it is moved or installed into the user's computer system.

Therefore, it would be desirable to have an improved method and apparatus to reduce the probability of disk drive failures prior to use in a data processing system.

SUMMARY OF THE INVENTION

The present invention provides a method and apparatus for testing storage devices in communication with a computer. Logical volumes are created on each storage device. Also, a file system is created on a first storage device in the storage devices, wherein the first storage device is a current storage device. The file system is copied from the current storage device to another storage device, wherein the another storage device is a storage device that has not received a copy of the file system wherein the another storage device becomes the current storage device. The file system is copied over and over again until all of the storage devices have received a copy of the file system. At this point, a single pass through these storage devices has occurred. Different numbers of passes may be selected depending on the amount of time during which testing should occur. Any errors that occur during access and copying of the file system to different storage devices are stored. Once a selected number of passes have occurred, a report of errors is generated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A–6J are diagrams illustrating a script used to test disks; and

FIGS. 7A–7B are diagrams illustrating a script used in a process used to cleanup disks after an aborted test of the disks.

DETAILED DESCRIPTION OF THE PREFERRED EMBODIMENT

Figure 1:
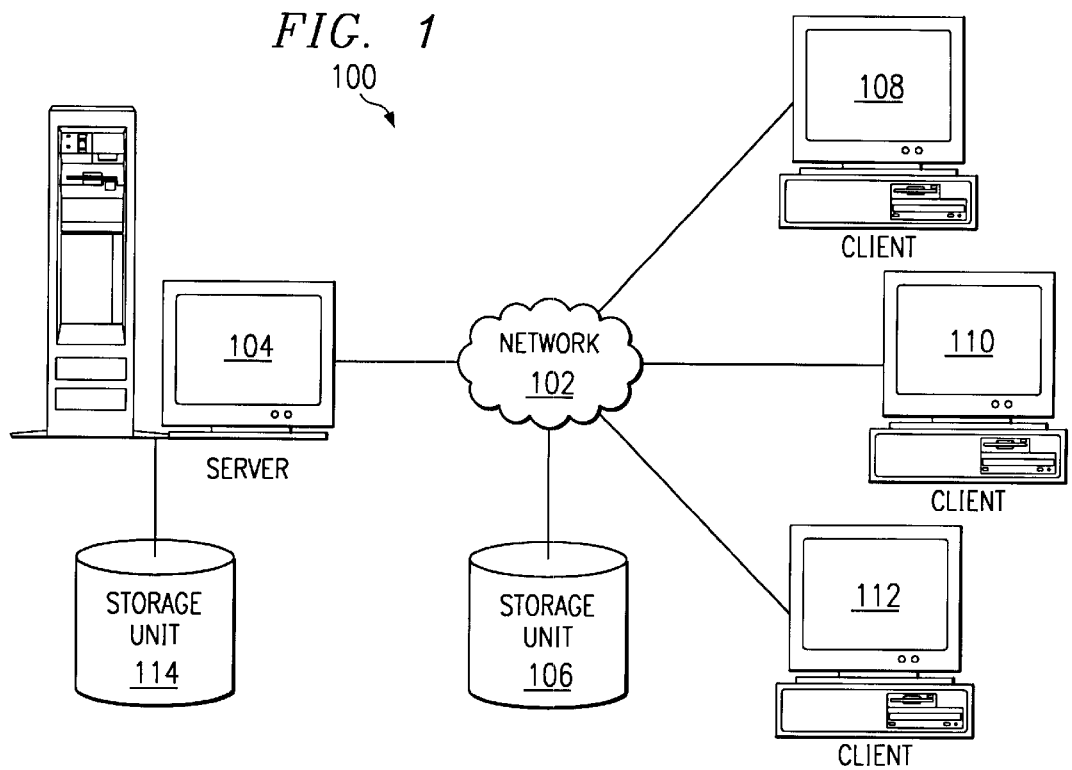
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Server 104 also includes a storage unit 114, which may be used to for storage of data such as, for example, databases, web sites, documents, and programs. Clients 108, 110, and 112 are clients to server 104.

Storage units 106 and 114 includes storage devices, such as for example, hard disks, CD-ROM drives, DVD, drives, and tape drives. The storage devices may be arranged in a number of ways including as an array of storage devices. Storage units 106 and 114 may be homogenous or heterogeneous depending on the design and implementation.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
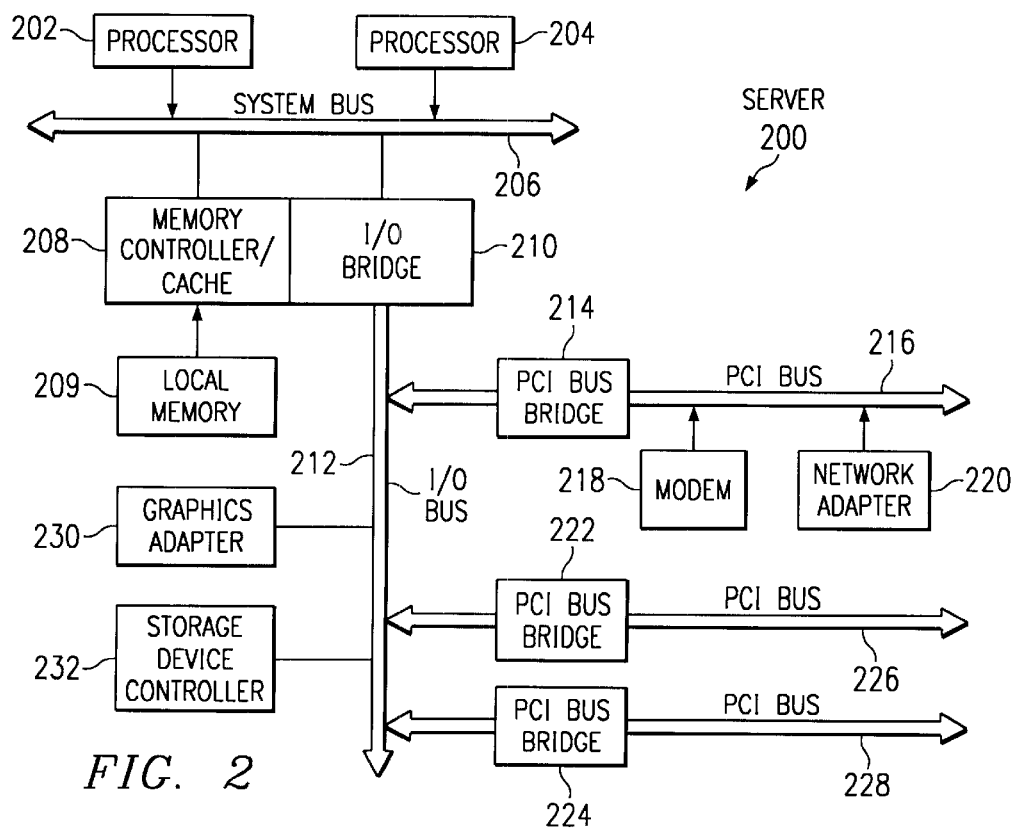
FIG. 2 is a block diagram depicting a data processing system, which may be implemented as a server.

Referring to FIG. 2, a block diagram depicts a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and storage unit 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
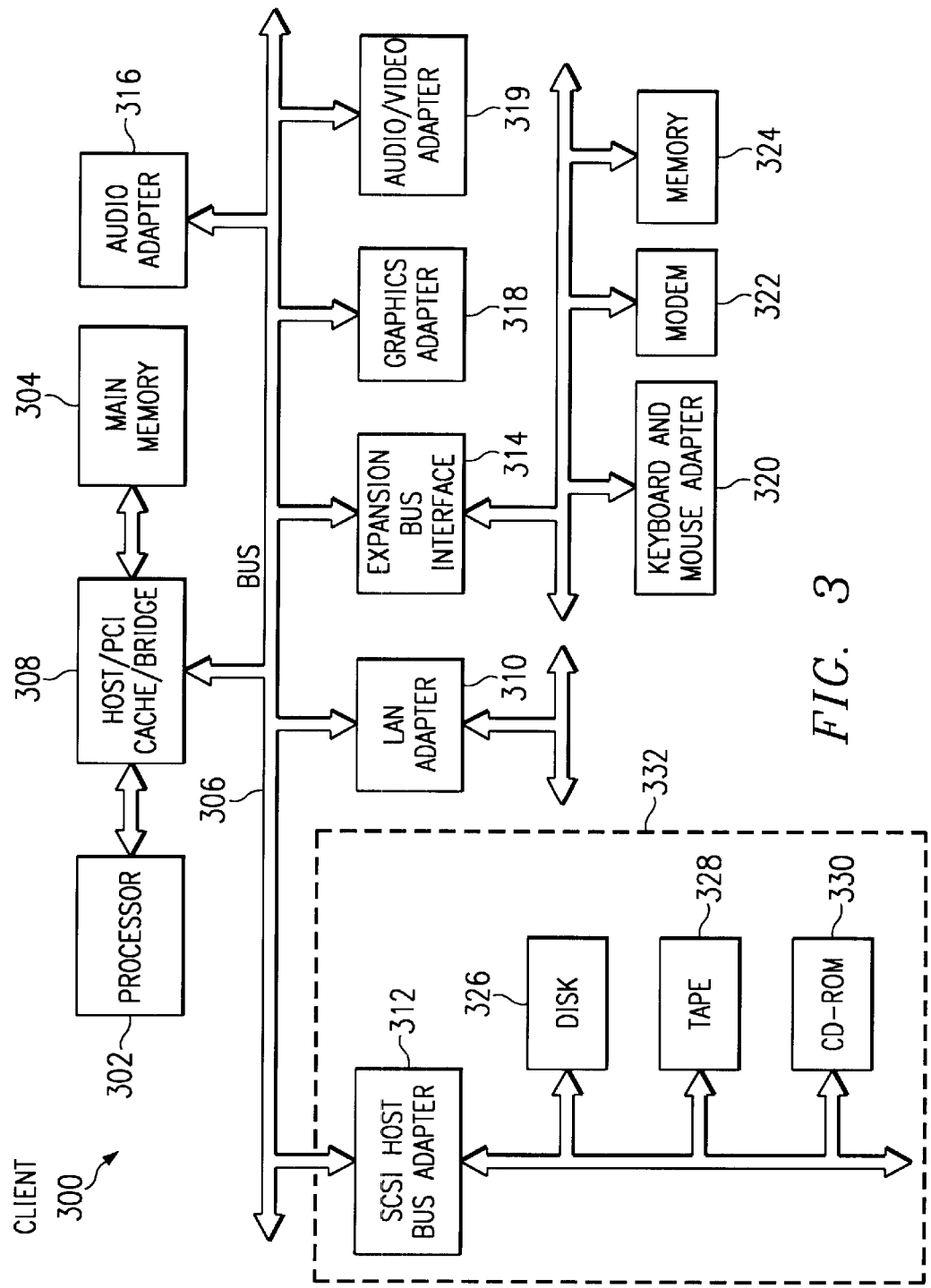
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

Figure 4:
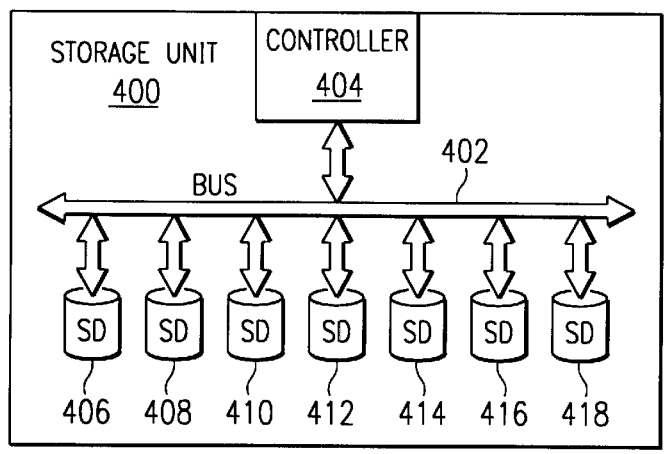
FIG. 4 is a block diagram of a storage unit depicted in accordance with a preferred embodiment of the present invention.

Turning next to FIG. 4, a block diagram of a storage unit is depicted in accordance with a preferred embodiment of the present invention. Storage unit 400 may be implemented for use as storage units 106 or 114 in FIG. 1. Additionally, storage unit 400 may be implemented as storage unit 232 in FIG. 2. In the depicted example, storage unit 400 includes a bus 402, which provides a connection between controller 404 and storage devices (SDs) 406–418. Controller 404 provides a mechanism for access to the storage devices and for control of the storage devices. Data that is to be written to storage devices 406–418 are processed through controller 404. In this example, storage devices 406–418 may be an array of hard disk drives, also referred to as disks. Alternatively, the storage devices may be, for example, an array of CD-ROM drives, DVD drives, or tape drives. Further, these storage devices may be a mix of different types of storage devices. For example, some of these storage devices may be disks while others may be CD-ROM drives.

Many storage devices will fail shortly after initial use based on a "reliability bathtub curve" in which a device is most likely to fail early or late during the lifetime of the device.

The present invention provides a method, apparatus, and instructions for testing of these storage devices in a manner that forces and detects disk failures prior to usage of the disks for data storage. Prior to use in a computing system, storage devices, such as disk drives, are often installed in a computing system days or even weeks before the user or "production" environment is set up. Thus, intensive testing of all of the disks within a storage unit may be made prior to actual use by users. To this end, the mechanism of the present invention provides a set of instructions in the form of a script that is used to test new disks continuously from installation time to production and implementation. A number of test passes and volume groups may be defined for a test of a set of storage devices. In the instance in which the storage devices are hard disks, logical volumes may be created on each disk with a data structure in the form of a file system being created on a first disk. The file system is then copied from this disk to a second disk that has not yet received a copy of the file system. Thereafter, the file system is copied from the second disk to a third disk that has not yet received a copy of the file system. For example, in FIG. 4, a file system may be created on storage device 406. This file system may be copied from storage device 406 to storage device 408 and from storage device 408 to storage device 410 all the way through storage device 418. This copying from disk to disk occurs until a copy of the file system has been copied to all of the disks. At this point, a single pass has been completed. Multiple passes may be made depending on the test parameters. During the various copying and accesses made to the disk, errors are stored for later analysis. The test may be cancelled upon the occurrence of a critical failure. In the depicted example, a critical failure occurs when a disk is no longer accessible. For example, a "soft" error would be stored in a system error log each time it occurs in a read or write that accesses the disk. The disk is still accessible, which allows the test to continue. In the case in which a critical error occurs, access to the disk is not possible and the script will exit with a notification to the user of the error.

After the test is completed, the disk may be cleaned up by removing the test logical volumes and file systems.

Figure 5B:
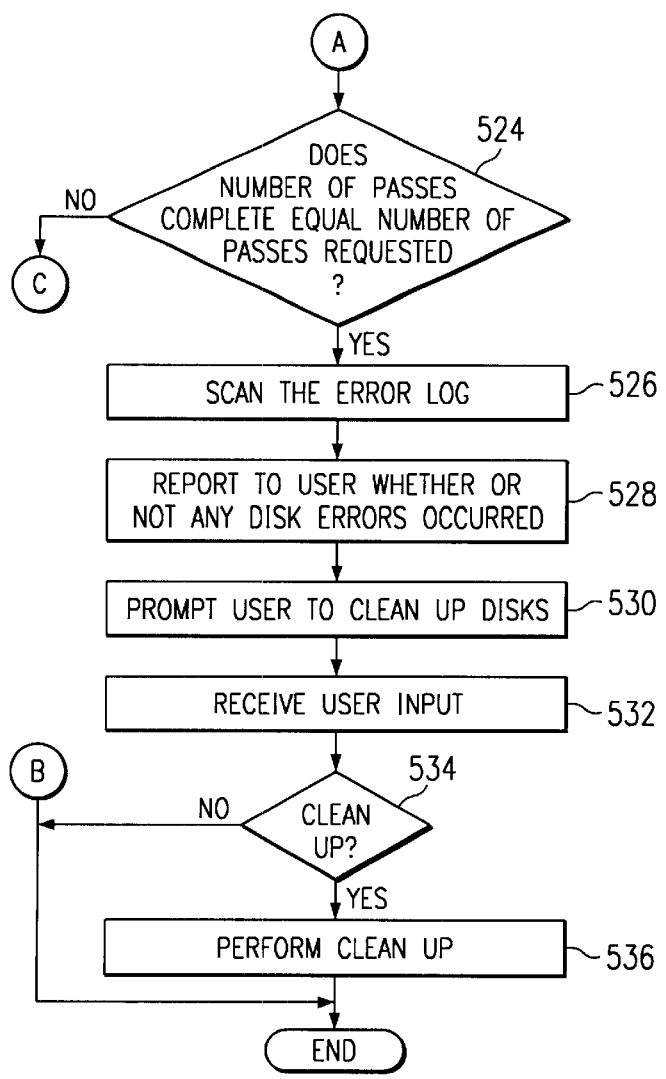
FIGS. 5A and 5B are one flowchart of a process used to test a group of storage devices.
Figure 5A:
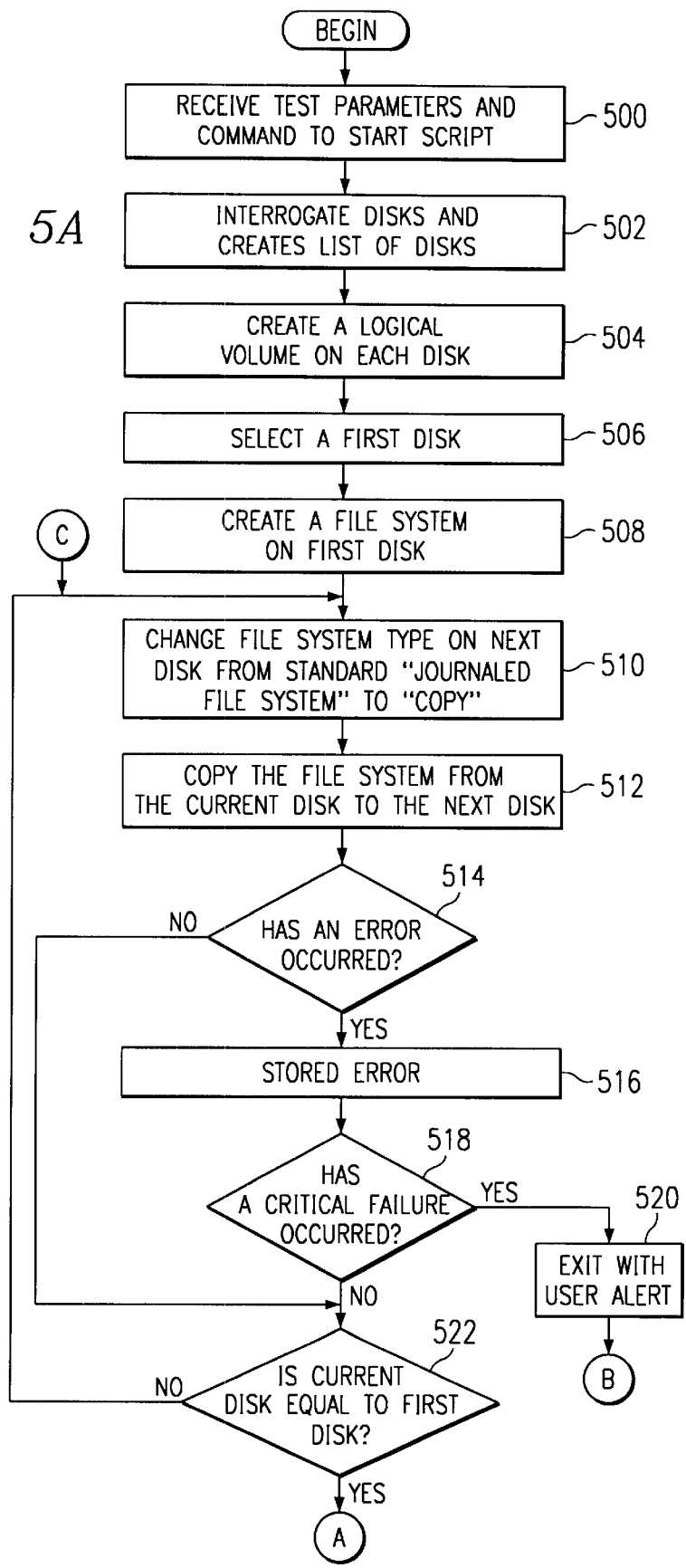

Turning next to FIGS. 5A and 5B, a flowchart of a process used to test a group of storage devices is depicted in accordance with a preferred embodiment of the present invention. The process illustrated in this figure is one that may be implemented in the form of a script and is directed towards testing hard disks. of course, the processes may be implemented in other forms other than a script and the tests may be applied to other types of storage devices other than hard disks. Prior to beginning the process, new disks that have been added to a data processing system are defined to the system. For example, in UNIX, new disks are defined using a volume group definition.

The process begins by receiving test parameters and a command to start the script (step 500). The user may enter the command to start the script along with flags or parameters to identify the number of test passes and a particular volume group in which to work. A volume group in UNIX is a collection of disks. A UNIX system may have a single volume group (usually called the "root volume group") or the system may have multiple volume groups. Multiple volume groups allow applications and data to be segregated on separate disks from the operating system. A disk can be logically accessible only after it has been assigned a volume group. A test pass as used in the depicted examples is the conveyance of a data structure such as, for example, the file system across each disk in a volume group. Thereafter, the disks are interrogated and a list of disks are made (step 502). This step identifies all available disks for the test. Next, a logical volume is created on each disk (step 504). In UNIX, a logical volume is a UNIX data container. A logical volume allocates space for file systems. Next, a first disk is selected from the available disks (step 506). In this example, the available disks are associated with numbers in an ordered fashion. This first disk may be selected as the disk having the lowest corresponding number. In UNIX, disks are given hard disks (hdisk) numbers by the order in which the disks are numbered on the bus. For example, when viewing disks in a system, the system may contain a number of disks labeled hdisk0 and hdisk1 internally, and hdisk2 through hdisk33 in an array. The selections also could be made based on letters, rather than numbers, when disks are given drive letters. Further, if serial number information can be derived from the disks, these numbers also may be used for selecting disks for testing. Alternatively, disks may be assigned numbers or selected for testing randomly or based on some other priority scheme. A file system is then created on this disk (step 508).

Next, the file system type on the next disk is changed from a standard Journaled File System to copy (step 510). In UNIX, file systems may be classified into several attribute categories, which includes Journaled File System classification. Changing a file systems. attribute from a standard Journaled File System to "copy" permits copying of the entire file system. This allows the test to copy not only files, but also control information from the control block, which is analogous to a file allocation table, on each disk.

Thereafter, the file system is copied from the current disk to the next disk (step 512). The next disk is a disk that has not received a copy of the file system in the current pass. In the depicted example, the next disk is selected by identifying the disk having the next highest number after the current disk. If the file system currently resides on the highest numbered disk, then the first disk becomes the next disk. The testing in this example progresses from the lowest numbered hard disk to the highest numbered hard disk. When the highest numbered hard disk is reached, the copying takes place back to the lowest numbered hard disk, which results in the completion of one pass.

Thereafter, a determination is made as to whether an error has occurred (step 514). If an error has occurred the error is stored (step 516). In the depicted example, the error is stored in a log. Next, a determination is made as to whether a critical failure has occurred (step 518). If a critical failure has occurred, the process exits with a user alert to indicate the occurrence of the critical failure to the user (step 520) with the process terminating thereafter.

With reference again to step 518, if a critical failure has not occurred, a determination is made as to whether the current disks is equal to the first disk (step 522). The process proceeds directly to this step from step 514 if no errors have occurred. The determination in step 522 may be made by comparing the number identifying the current disks with the number identifying the first disk selected in step 506. This step is used to identify a pass through the disks has been completed. If the current disk is not equal to the first disk, the process returns to step 510. Otherwise, a determination is then made as to whether the number of passes made equals the number of passes requested (step 524). If the number of passes made does not equal the number of passes requested, the process returns to step 510 as described above.

If the number of passes completed equals the number of passes requested, the error log is then scanned (step 526). This step is employed to determine whether any errors have occurred during the test. Thereafter a report is made to the user as to whether any disks errors have occurred (step 528). This report may be made in various forms. For example, the report may be displayed on the screen to the user, printed out in hard copy, or stored to a file. Then the user is prompted to cleanup the disks (step 530). This step involves providing the user a prompt with a selection or entry to indicate that the disks should be cleaned up. The default may be to cleanup the disks. Thereafter, user input is received in response to the prompt (step 532). A determination is made as to whether the disks should be cleaned up (step 534). If the disks are to be cleaned up, a cleanup is performed (step 536) with the process terminating thereafter. In this example, disks are cleaned up by removing the test logical volumes and file systems. If the disks are not to be cleaned up, the process also terminates.

Although the steps in FIGS. 5A and 5B are described with reference to use with UNIX, these processes may be applied to other types of operating systems, such as, for example, OS2 from International Business Machines Corporation and Windows NT from Microsoft Corporation. For example, the UNIX process of placing disks into a volume group, creating a logical volume, creating a first file system, changing the file system to copy, and copying the file system could be implemented in a process in Windows NT, which ensures that the operating system can read and write to the disk, create a large data file on the first disk, and copy the large data file.

Turning now to FIGS. 6A–6J, diagrams illustrating a script used to test disks are depicted in accordance with a preferred embodiment of the present invention. The script illustrated in these diagrams is designed for UNIX, but the processes performed by the script may be applied to other types of operating systems to test storage devices.

The script illustrated in these figures begins by providing instructions in section 600 in FIG. 6A to perform initialization of various variables used in the process. A function to clean up logical volumes and file systems is found in section 602 in FIG. 6B. Section 606 in FIGS. 6B and 6C, is used to perform cleanup on any existing files that may be present from a previous run or pass through the disks. In section 608 in FIG. 6D the instructions are used to set runtime options for the process based on user flags or parameters entered with the command used to initiate execution of the script. In FIG. 6E, the time that the test begins is recorded in response to instructions in section 610.

Thereafter, the names of the disks selected for testing are written into a file using the instruction in section 612. The number of disks are counted and assigned to a variable using instructions in section 614. In FIG. 6F, a logical volume is created on each disk in response to the instruction in section 616. The logical volumes are holders for the file systems on each of the disks. In section 618, a check is initiated each time a logical volume is created to see if the creation was successful. If the creation was not successful, the user is alerted.

In FIG. 6G, a file system is created on a first disk by the instruction in section 620. At this time, the logical volumes have been created on each of the disks. A file system has been created on the first logical volume, located on the first disk. In section 622 in FIG. 6H, a tracking mechanism for tracking disks that have received the file system is setup. The instructions changes the disk type to copy, FIG. 6I, section 628. Also, this section will set the last disk equal to the first disk if needed. The instruction in section 630 copies the files system from one disk to another disk. A check for errors in the copying of the file disk is performed by the instructions in section 632. FIG. 6J, section 634 provides instructions to change the type of the disk from journaled file system to copy. The type will be automatically changed by the operating system back to journaled file system after the copy operation. Next, information is recorded by instruction in step 636. For example, the number of passes completed and the fact that no critical failures have been detected may be detected by these instructions. Then, a check for hard disks errors is made using the instructions in section 638. This section generates a report to the user of various errors that may have occurred from copying the file system from disk to disk.

With reference next to FIGS. 7A–7B, diagrams illustrating a script used in a process used to cleanup disks after an aborted test of the disks are depicted in accordance with a preferred embodiment of the present invention. These diagrams illustrate a file cleanup that may be initiated by a user after an aborted execution of the script illustrated in FIGS. 6A–6J. This script may be used in response to an execution of a control C command issued during a file system copy.

In FIG. 7A, information from the disk file is gathered using instruction in section 700. While in FIG. 7B, the volume group is resynchronized using the instruction in section 702. In section 704, the file system is removed. Thereafter, the logical volume is removed using the instruction in section 708.

Thus, the present invention provides a mechanism for decreasing the chance of failure in a group of storage devices by providing additional testing or "burn-in" time such that a storage device reaches a low portion of a curve in which failures occur given that the probability of failure within a given system is highest early in the lifecycle of the system. Using the mechanism of the present invention, the processes initiated by the scripts described above may continuously test storage devices for days, adjusting for the convenience in the schedule of a user.

The processes described and illustrated above may be initiated in a variety of ways. For example, the scripts may be initiated at a server, such as server 104 to test storage units 114 or 106 in FIG. 1. Alternatively, testing of these storage units may be initiated from another computing system such as client 112 in FIG. 1. In the depicted examples, logical volumes are created on each disk and the file system is moved or passed from disk to disk. The logical volumes remain during testing while only one copy of the file system is present. Alternatively, logical volumes along with the file systems may be created and deleted on each disk through each copy step described above. Further, it is also possible to copy a data structure containing large files from disk to disk.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for testing a plurality of storage devices in communications with a computer, the method comprising the computer implemented steps of:

creating logical volumes on each storage device within the plurality of storage devices;

creating a file system on a first storage device within the plurality of storage devices, wherein the first storage device is a current storage device;

testing said plurality of storage devices in a test environment by copying the file system from the current storage device to another storage device within the plurality of storage devices, wherein the other storage device is a storage device within the plurality of storage devices that has not received a copy of the file system, and wherein the other storage device becomes the current storage device; and repeating the testing step until all of the storage devices within the plurality of storage devices have been tested by receiving a copy of the file system.

2. The method of claim 1, wherein a pass is completed after all of the storage devices within the plurality of storage devices have received a copy of the file system.

3. The method of claim 1 further comprising:

repeating steps of testing and repeating for a selected number of passes.

4. The method of claim 1, wherein a plurality of file systems are present in response to completion of the repeating step and further comprising:

responsive to completion of the repeating step, removing the logical volumes and the file systems from the plurality of storage devices.

5. The method of claim 1, wherein the plurality of storage devices are a plurality of hard disk drives.

6. The method of claim 1, wherein the plurality of hard disk drives are arranged in an array.

7. The method of claim 1 further comprising:

storing errors occurring during copying of the file system, whereby the copying is performed during said testing.

8. The method of claim 1 further comprising:

monitoring for a storage device error each time copying of the file system occurs, whereby the copying is performed during said testing; and responsive to detecting the storage device error, storing the error in a data structure.

9. The method of claim 8 further comprising:

responsive to completion of the repeating step, searching the data structure for an error; and responsive to finding an error in the data structure, providing an alert to indicate a presence of the error.

10. The method of claim 8 further comprising:

responsive to a critical error prior to completion of the repeating step, halting the repeating step and generating an alert to indicate the critical error.

11. A method in a data processing system for testing a plurality of storage devices, the method comprising:

creating a data structure on a first storage device within the plurality of storage devices;

testing said plurality of storage devices in a test environment by copying the data structure to another storage device within the plurality of storage devices, wherein the data is absent on the other storage device; and repeating the testing step until the data structure has been copied to all of the plurality of storage devices.

12. The method of claim 11, wherein a storage device last receiving the data structure is a data storage device and wherein the step of testing comprises:

copying the data structure from the data storage device to another storage device within the plurality of storage devices, wherein the data structure is absent on the other storage device.

13. The method of claim 12, wherein the data structure is a file.

14. The method of claim 12, wherein the data structure is a file system.

15. The method of claim 12, repeating the copying step until the data structure has been copied to all of the plurality of storage devices a selected number of times.

16. The method of claim 12 further comprising:

removing the data structure from the plurality of disks after the data structure has been copied to all of the plurality of storage devices.

17. The method of claim 12 further comprising:

removing the data structure from the storage device after the data structure has been copied from the storage device to another storage device; and wherein the plurality of storage devices are a plurality of hard disks.

18. A computer for testing a plurality of storage devices in communications with a computer, comprising:

first creation means for creating logical volumes on each storage device within the plurality of storage devices;

second creation means for creating a file system on a first storage device within the plurality of storage devices, wherein the first storage device is a current storage device;

a test environment including copying means for testing said plurality of storage devices by copying the file system from the current storage device to another storage device within the plurality of storage devices, wherein the other storage device is a storage device within the plurality of storage devices that has not received a copy of the file system, and wherein the other storage device becomes the current storage device; and repeating means for repeating the copying by the copying means until all of the storage devices within the plurality of storage devices have been tested by receiving a copy of the file system.

19. The computer of claim 18, wherein a pass is completed after all of the storage devices within the plurality of storage devices have received a copy of the file system.

20. The computer of claim 18 further comprising:
means for repeating copying by the copying means and repeating by the repeating means for a selected number of passes.

21. The computer of claim 18, wherein a plurality of file systems are present in response to completion of the repeating means and further comprising:
removal means, responsive to completion of the repeating means, for removing the logical volumes and the file systems from the plurality of storage devices.

22. The computer of claim 18, wherein the plurality of storage devices are a plurality of hard disk drives.

23. The computer of claim 18, wherein the plurality of hard disk drives are arranged in an array.

24. The computer of claim 18 further comprising:
storage means for storing errors occurring during copying of the file system, whereby the copying is performed during said testing.

25. The computer of claim 18 further comprising:
monitoring means for monitoring for a storage device error each time copying of the file system occurs, whereby the copying is performed during said testing; and
storage means, responsive to detecting the storage device error, for storing the error in a data structure.

26. The computer of claim 25 further comprising:
searching means, responsive to completion of the repeating means, for searching the data structure for an error; and
alert means, responsive to finding an error in the data structure, for providing an alert to indicate a presence of the error.

27. The computer of claim 25 further comprising:
halting means, responsive to a critical error prior to completion of the repeating means, for halting the repeating means and generating an alert to indicate the critical error.

28. A data processing system for testing a plurality of storage devices, the data processing system comprising:
creation means for creating a data structure on a first storage device within the plurality of storage devices;
a test environment including copying means for testing said plurality of storage devices by copying the data structure to another storage device within the plurality of storage devices, wherein the data is absent on the other storage device; and
repeating means for repeating the copying by the copying means until the data structure has been copied to all of the plurality of storage devices.

29. The data processing system of claim 28, wherein the storage device last receiving the data structure is a current storage device and wherein the copying means comprises:
copying means for copying the data structure from the data storage device to another storage device within the plurality of storage devices, wherein the data structure is absent on the other storage device.

30. The data processing system of claim 29, wherein the data structure is a file.

31. The data processing system of claim 29, wherein the data structure is a file system.

32. The data processing system of claim 29, repeating means for repeating copying by the copying means until the data structure has been copied to all of the plurality of storage devices a selected number of times.

33. The data processing system of claim 29 further comprising:
removal means for removing the data structure from the plurality of disks after the data structure has been copied to all of the plurality of storage devices.

34. The data processing system of claim 29 further comprising:
removal means for removing the data structure from the storage device after the data structure has been copied from the storage device to another storage device; and
wherein the plurality of storage devices are a plurality of hard disks.

35. A computer program product in a computer readable medium for testing a plurality of storage devices in communications with a computer, the computer program product comprising:
first instructions for creating logical volumes on each storage device within the plurality of storage devices;
second instructions for creating a file system on a first storage device within the plurality of storage devices, wherein the first storage device is a current storage device;
third instructions for testing said plurality of storage devices in a test environment by copying the file system from the current storage device to another storage device within the plurality of storage devices, wherein the other storage device is a storage device within the plurality of storage devices that has not received a copy of the file system, and wherein the other storage device becomes the current storage device; and
fourth instructions for repeating the third instructions until all of the storage devices within the plurality of storage devices have received a copy of the file system.

36. A computer program product in a computer readable medium for testing a plurality of storage devices, the computer program product comprising:
first instructions for creating a data structure on a first storage device within the plurality of storage devices;
second instructions for testing said plurality of storage devices in a test environment by copying the data structure to another storage device within the plurality of storage devices, wherein the data is absent on the other storage device; and
third instructions for repeating the copying step until the data structure has been copied to all of the plurality of storage devices.

37. A method for testing a plurality of storage devices in communications with a computer, the method comprising the computer implemented steps of:
creating logical volumes on each storage device within the plurality of storage devices;
creating a file system on a first storage device within the plurality of storage devices, wherein the first storage device is a current storage device;
copying the file system from the current storage device to another storage device within the plurality of storage devices, wherein the another storage device is a storage device within the plurality of storage devices that has not received a copy of the file system wherein the another storage device becomes the current storage device;
repeating the copying step until all of the storage devices within the plurality of storage devices have received a copy of the file system;
wherein a plurality of file systems are present in response to completion of the repeating step; and
responsive to completion of the repeating step, removing the logical volumes and the file systems from the plurality of storage device drives.

38. A method in a data processing system for testing a plurality of storage devices, the method comprising:

creating a data structure on a first storage device within the plurality of storage devices;

copying the data structure to another storage device within the plurality of storage devices, wherein an absence of the data on the another storage device is present;

repeating the copying step until the data structure has been copied to all of the plurality of storage devices;

wherein a storage device last receiving the data structure is a data storage device;

wherein the step of copying comprises copying the data structure from the data storage device to another storage device within the plurality of storage devices, wherein an absence of the data structure on the another storage device is present; and removing the data structure from the plurality of disks after the data structure has been copied to all of the plurality of storage devices.

39. A method in a data processing system for testing a plurality of storage devices, the method comprising:

creating a data structure on a first storage device within the plurality of storage devices;

copying the data structure to another storage device within the plurality of storage devices, wherein an absence of the data on the another storage device is present;

repeating the copying step until the data structure has been copied to all of the plurality of storage devices;

wherein a storage device last receiving the data structure is a data storage device;

wherein the step of copying comprises copying the data structure from the data storage device to another storage device within the plurality of storage devices, wherein an absence of the data structure on the another storage device is present;

removing the data structure from the storage device after the data structure has been copied from the storage device to another storage device; and wherein the plurality of storage devices are a plurality of hard disks.

40. A computer for testing a plurality of storage devices in communications with a computer, the method comprising the computer implemented steps of:

first creation means for creating logical volumes on each storage device within the plurality of storage devices;

second creation means for creating a file system on a first storage device within the plurality of storage devices, wherein the first storage device is a current storage device;

copying means for copying the file system from the current storage device to another storage device within the plurality of storage devices, wherein the another storage device is a storage device within the plurality of storage devices that has not received a copy of the file system wherein the another storage device becomes the current storage device;

repeating means for repeating the copying by the copying means until all of the storage devices within the plurality of storage devices have received a copy of the file system;

wherein a plurality of file systems are present in response to completion of the repeating mean; and removal means, responsive to completion of the repeating means, for removing the logical volumes and the file systems from the plurality of storage device drives.

41. A data processing system for testing a plurality of storage devices, the data processing system comprising:

creation means for creating a data structure on a first storage device within the plurality of storage devices;

copying means for copying the data structure to another storage device within the plurality of storage devices, wherein an absence of the data on the another storage device is present;

repeating means for repeating the copying by the copying means until the data structure has been copied to all of the plurality of storage devices;

wherein the storage device last receiving the data structure is a current storage device;

wherein the copying means comprises copying means for copying the data structure from the data storage device to another storage device within the plurality of storage devices, wherein an absence of the data structure on the another storage device is present; and removal means for removing the data structure from the plurality of disks after the data structure has been copied to all of the plurality of storage devices.

42. A data processing system for testing a plurality of storage devices, the data processing system comprising:

creation means for creating a data structure on a first storage device within the plurality of storage devices;

copying means for copying the data structure to another storage device within the plurality of storage devices, wherein an absence of the data on the another storage device is present;

repeating means for repeating the copying by the copying means until the data structure has been copied to all of the plurality of storage devices;

wherein the storage device last receiving the data structure is a current storage device;

wherein the copying means comprises copying means for copying the data structure from the data storage device to another storage device within the plurality of storage devices, wherein an absence of the data structure on the another storage device is present;

removal means for removing the data structure from the storage device after the data structure has been copied from the storage device to another storage device; and wherein the plurality of storage devices are a plurality of hard disks.

43. The method according to claim 1, further comprising the step of:

testing said plurality of storage devices in said test environment prior to a use of said plurality of storage devices in a user environment.

44. The method according to claim 11, further comprising the step of:

testing said plurality of storage devices in said test environment prior to a use of said plurality of storage devices in a user environment.

45. The computer according to claim 18, further comprising:

said test environment for testing said plurality of storage devices in said test environment prior to a use of said plurality of storage devices in a user environment.

46. The data processing system according to claim 28, further comprising:

said test environment for testing said plurality of storage devices in said test environment prior to a use of said plurality of storage devices in a user environment.

47. The computer program product according to claim 35, further comprising:

fifth instruction means for testing said plurality of storage devices in said test environment prior to a use of said plurality of storage devices in a user environment.

48. The computer program product according to claim 36, further comprising:

fourth instruction means for testing said plurality of storage devices in said test environment prior to a use of said plurality of storage devices in a user environment.

* * * * *

UNITED STATES PATENT AND TRADEMARK OFFICE
CERTIFICATE OF CORRECTION

PATENT NO.     : 6,438,714 B1
DATED          : August 20, 2002
INVENTOR(S)    : Canestaro et al.

It is certified that error appears in the above-identified patent and that said Letters Patent is hereby corrected as shown below:

Column 6,
Line 38, after "systems", please delete "." and insert -- ' --.

Column 10,
Line 28, before "step", please delete "copying" and insert -- testing --.

Signed and Sealed this

Nineteenth Day of August, 2003

JAMES E. ROGAN
*Director of the United States Patent and Trademark Office*